Patented June 21, 1938

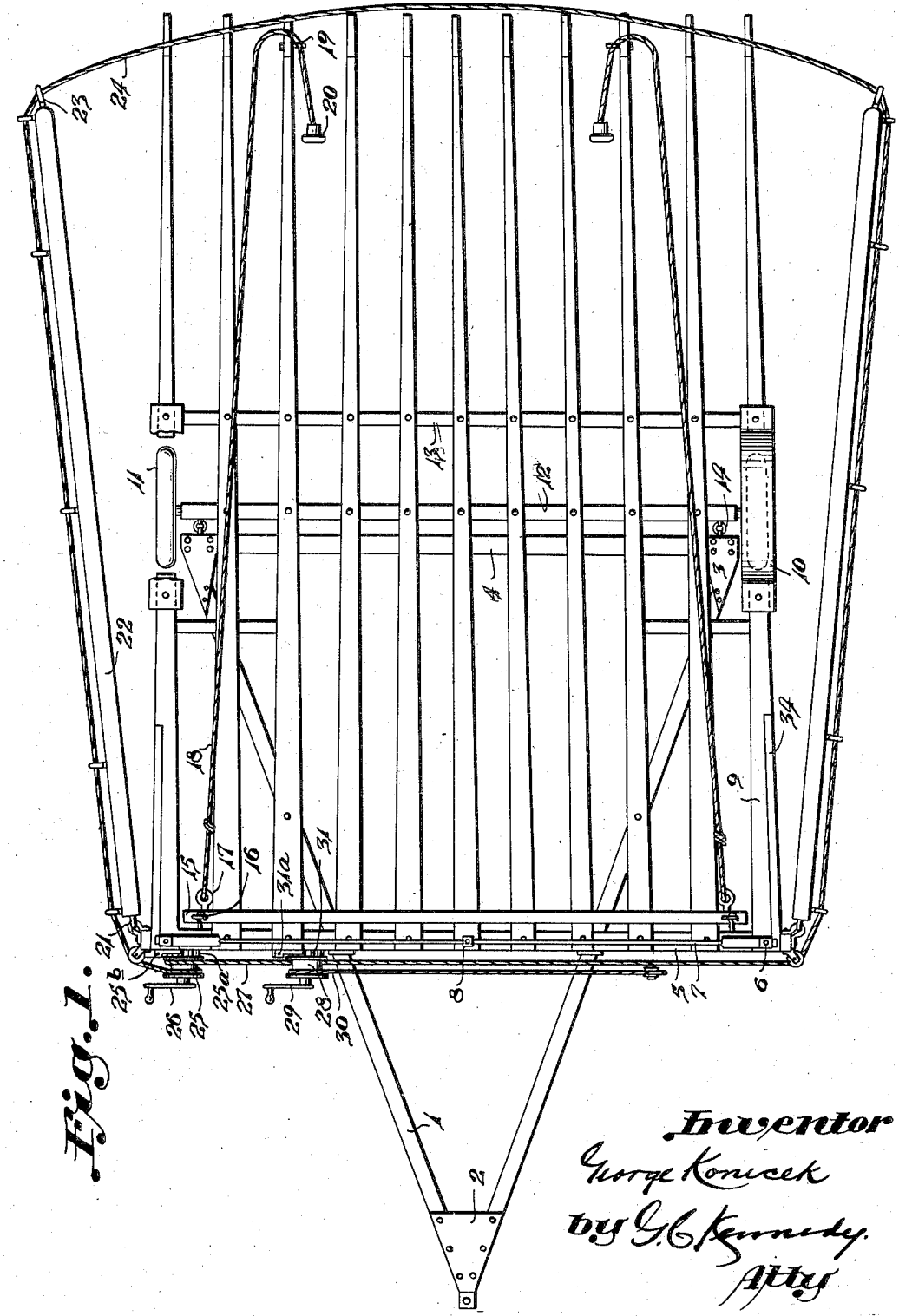

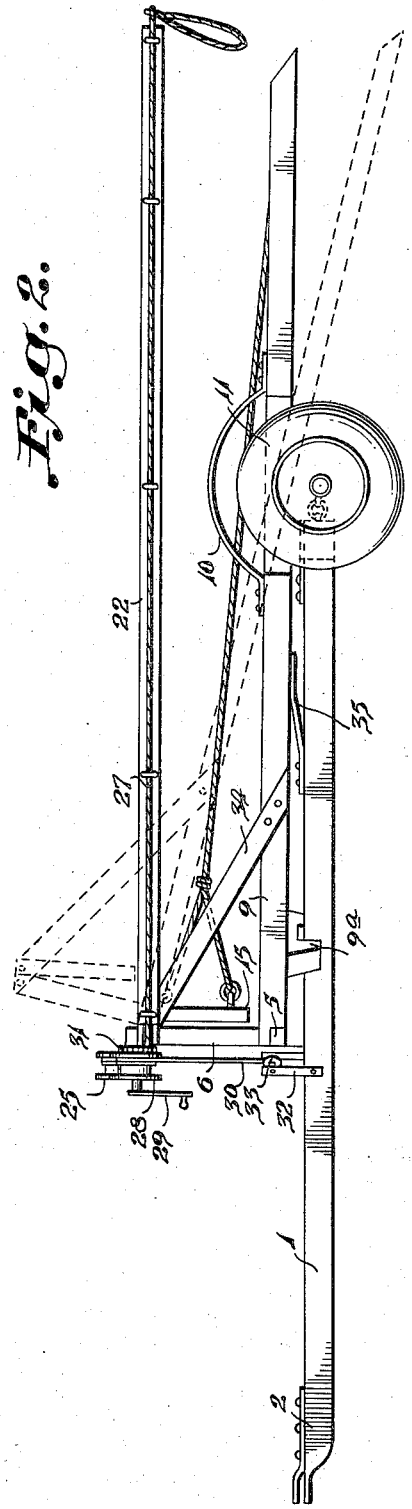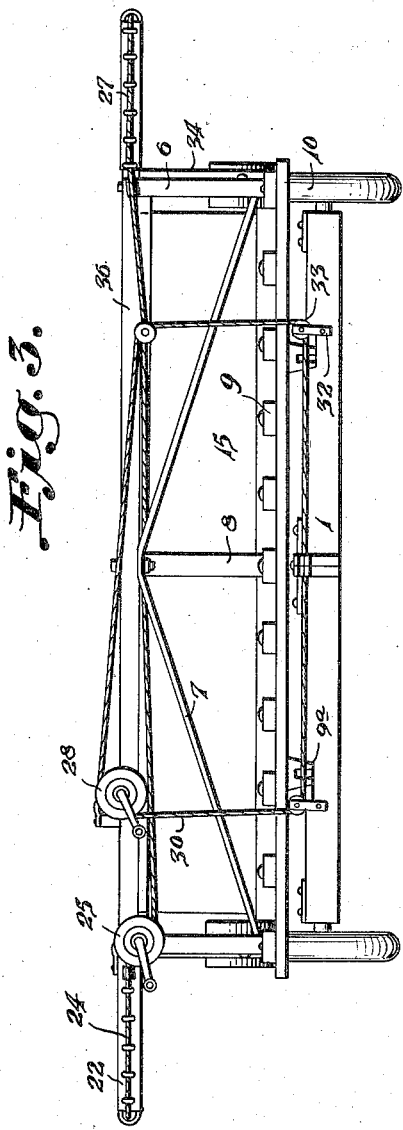

2,121,153

UNITED STATES PATENT OFFICE 2,121,153

TRANSFER CART

George Konicek, Bruce Township, Benton County, Iowa

Application June 3, 1937, Serial No. 146,232

6 Claims. (Cl. 214—66)

My invention relates to improvements in transfer carts, and an object of my invention is to provide a wheeled cart of that class, constructed for use in receiving and carrying to a place of deposit, hay, cut grain or the like or other things, and being of light but relatively inexpensive construction, and dumpable.

Another object of my improvements is to provide the cart with a movable sweep contrivance for manual traction in moving and delivering a load to the rear.

Another object of my improvements is to furnish swingable side bars for the cart hinged in front to be spread apart at the rear, and having the rear ends thereof connected by a flexible member permitting accommodation to a bulky load of hay or the like, while retaining the load upon the cart releasably.

Another object of my improvements is to provide means for tilting the cart body rearwardly to deliver the load easily, such means including winch means operable to tilt the cart body or to return it to a horizontal position on the carrying wheels and locked in that position releasably.

I have attained all of these objects in the means and special cart construction which is hereinafter described and claimed, and illustrated in the accompanying drawings.

It is however to be understood that slight departures may be made from the device shown, and its structures and connections without departing from the invention hereinafter described and as claimed herein.

Fig. 1 is a top plan of my improved transfer cart, with parts broken away. Fig. 2 is a side elevation of the cart, with parts removed, and with some other parts shown in broken lines. Fig. 3 is a front elevation.

It is my design to supply a cart of this type which can be an intermediary means of transfer between a mechanism, such as a reaper, harvester, or vehicle of any kind, for hay or cut grain and the like to a place of deposit, or for stacking, or carriage to another vehicle.

The cart has in front a V-shaped traction member 1 with a hitch-plate 2 in advance securing together its convergent ends, the divergent rear ends of the members being rigidly connected by metal plates to a cross-bar 4, making a strong but light construction. As shown in Fig. 1, a body construction is positioned over the rear parts of the traction member 1, consisting of a cross-beam 5 in front having a plurality of relatively long rearwardly tapering arms 9, spaced apart in parallel, and fastened over and crossed by a spaced pair of cross-beams 12 and 13, the beam 12 having the carrying wheels 11 mounted on its ends within a gap in each of the side arms 9. This gap is bridged by an arcuate metal covering element 10.

This feature is shown in Fig. 2, and linkages 14 connect end parts of the beams 4 and 12 together, allowing the body construction 5 and 9 to be flexibly connected to the draft members 1, and permitting the body to be tilted rearwardly relative thereto.

At each side spring bars 35 are mounted on the members 1 to bear resiliently and there support the body of the cart in front. The wheels 11 are situated about midway relative to the cart body, to permit of such tilting of the body at times rearwardly, as shown in dotted lines in Fig. 2. The forward cross-bar 5 has end standards 6 fixed thereto, with brace connections 34 to parts of the side arms 9 to the rear, and a top bar 36 is mounted on the standards 6, and supported by a truss rod 7 across the middle standard 8.

A cross plank 15 immediately to the rear of a metal rod truss 7 between the end standards 6 and a medial standard 8, hangs on end linkages 16 to the forward part of the frame, as shown. As shown in said Fig. 1, side ropes 18 have their forward ends secured in metal loops 17 on the rear face of the plank 15 at its ends, the ropes being directed rearwardly and passed through eyes 19 on the rear ends of a pair of the arms 9, and having end grips 20.

Furcated castings 9a are fixed on the under faces of two bars 9 to ride upon the draft members 1, to prevent side play of the barred platform relative thereto.

Side arms 22 are linked at their forward ends loosely on loops 21 to swing outwardly to and fro. Longitudinally spaced eyes 23 are fixed along the outer walls of the arms 22, and a rope or cable 24 is reeved through the eyes along both arms, with the middle reach carried across the rear part of the platform arms 9, and having its forward opposite ends positioned in front, with one end part 27 crossing the forward end of the platform and end connected to the rear portion of the length of the winch drum 25 to wind thereon in one direction. The other end part of the cable 24 is end connected also to the winch drum 25 and to wind oppositely upon said drum, whereby the loop of the cable is either diminished or increased as may be necessary to surround, bind and retain on the arms or platform 9 a load such as hay, straw, bundles of cut grain, or other substances or packages to be transferred from one location to another. The cart therefore may receive on a field a loading from a mower or harvester, or otherwise, transfer the same to be unloaded on the ground, within a storage building, or other place, as desired, and the cart may have its draft members 1 connected by the hitch device 2 to draft means, such as draft animals or a tractor. It will be understood, that the showing of a plurality of carrying arms 9 is for illustration merely of one form of my invention, which may use an imperforate platform instead. The winch 25 may be manually rotated by a crank handle 26, and on the shaft thereof is fixed a ratchet-wheel 25a engaged by a spring pawl 25b for holding the looped cable 24—27 more or less contracted in its loop as may be necessary in holding on the platform securely loads of different bulk.

A similar winch drum 28 is also rotatably mounted on the forward part of the cart, having a crank handle 29, a similar ratchet wheel 31 controlled by a like spring pawl 31a. A cable 30 is connected at one end to the frame bar 36, and carried thence around rollers 33 on brackets 32 on the draft members 1, and thence on around to be end connected to the drum 28, and by this means the frame may be tilted, or returned and held.

The sweep member or cross-beam 15 may be released from the hooks 16, and drawn rearwardly pressing against a load, such as is mentioned hereinbefore, to either move the load partially along the platform members 9, or to discharge the load to the rear, when the winch drum 28 is rotated appropriately to allow the platform to tilt to the rear by unreeling the cable 30. When the load is thus discharged, the winch drum 28 may be rotated oppositely to pull down the forward part of the frame to keep it level for reloading. The dotted lines in Fig. 2 show the tilted position of the frame.

I claim:

1. In a transfer cart, a platform mounted for transportation, and tiltable controllably rearwardly, the platform having laterally hinged sidebars at the front to swing to and fro outwardly, and flexible means mounted on and along the side-bars to cross the rear of the platform, with means for exercising traction upon the flexible means controllably to encompass an load on the platform and retain it thereon adjustingly.

2. In a transfer cart, a platform mounted for transportation tiltably, a flattened sweep-member releasably suspended upon and positioned across the forward end thereof and releasably connected thereto, and pull-cables having pairs of terminals end-connected to upper and lower corners of opposite parts of the sweep-member for manually shifting it rearwardly along the platform to shift or discharge a load thereon, securing means on the rear of the platform, and handles on the rear ends of the cables.

3. In a transfer cart, a platform mounted tiltably thereon, a manually operable ratchet-controlled sheave mounted on the platform, a sub-frame upon which the platform is rearwardly tiltable, horizontally spaced pulleys mounted transversely opposite on the sub-frame and a pulley on the platform structure above one of said pulleys and transversely opposite said sheave, a cable end-connected to said sheave to wind thereon, carried thence about all said pulleys, and then returned to and end-connected to said sheave to wind thereon, operable by means of the sheave to tilt the platform rearwardly to a discharging position, and when the sheave is reversely rotated to return it to its initial position.

4. In a transfer cart, a wheeled draft-frame, a platform mounted on the draft-frame for rearward tilting, means operatively connected between the platform and draft-frame for tilting or returning the platform to an initial carrying position, arms alongside both sides of the platform, spaced thereabove, and having their forward ends connected thereto to swing laterally, eyes projecting laterally on and along said arms, a manually operable ratchet-controlled sheave rotatably mounted on the forward part of the platform structure, and a cable end-connected to said sheave to wind thereon, carried thence through all of said eyes on both arms and then end-connected to said sheave to wind thereon reversely.

5. In a transfer cart, wheeled draft-means, a platform mounted swingably thereon for tilting rearwardly, means on both the platform and draft-means for tilting or returning and lockably holding the platform, the platform having a transverse front structure, a ratchet-controlled sheave rotatably mounted on the forward face of said structure, laterally swingable arms on said structure, a cable end-connected at both ends to said sheave to respectively wind thereon oppositely and mounted slidably on said arms to cross the rear part of the platform for adjustably encompassing a load thereon, means operatively positioned between said draft-means and said platform for resiliently supporting the platform, and recessed hangers on the forward lateral portions of the platform adapted and shaped to engage fitting portions of the draft-frame releasably, to prevent side swing of the platform when in a carrying position.

6. In a transfer cart, wheeled draft-means, a platform mounted swingably thereon for tilting rearwardly and including a forward rigid transverse structure, a ratchet-controlled sheave mounted on said structure, a cable end-connected at both ends to said sheave to respectively wind thereon oppositely, the cable encompassing the platform to adjustably include a loading thereon, means for tilting and returning said platform to a loading position and securing it in that position releasably, and other means removably hung on said structure in the rear and including traction means at opposite ends thereof for maintaining it in a vertical position, for sweeping the platform loading to the rear when the latter is tilted to a discharging position.

GEORGE KONICEK.